Figure 1:
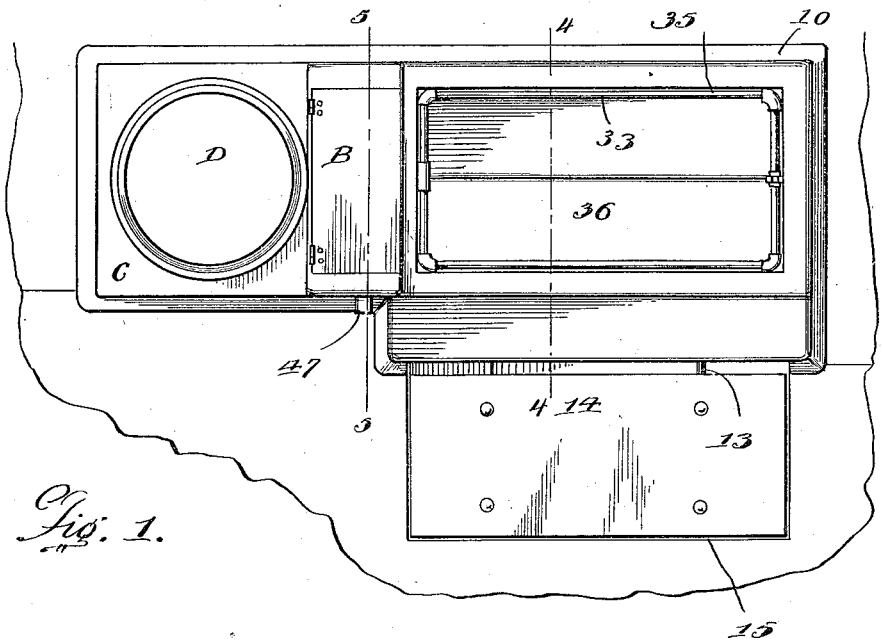

J. A. MAYNARD.
WATERING TROUGH.
APPLICATION FILED MAR. 14, 1914.

1,139,132.

Patented May 11, 1915.
3 SHEETS—SHEET 1.

Inventor
Joseph A. Maynard.

Witnesses
Frederick L. Fox.

By Victor J. Evans
Attorney

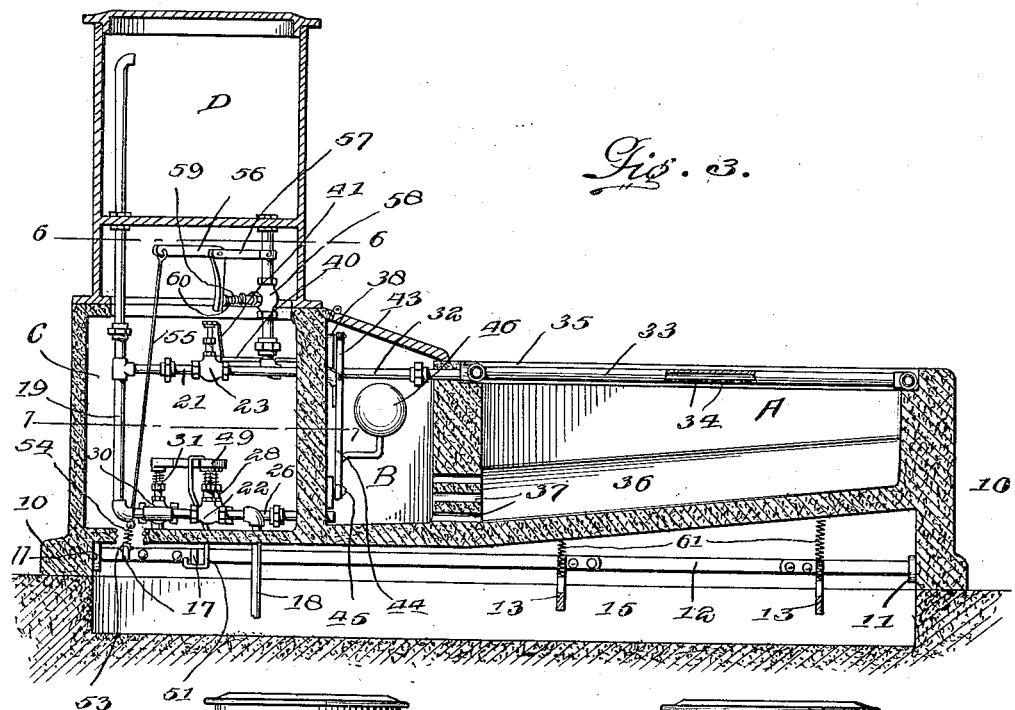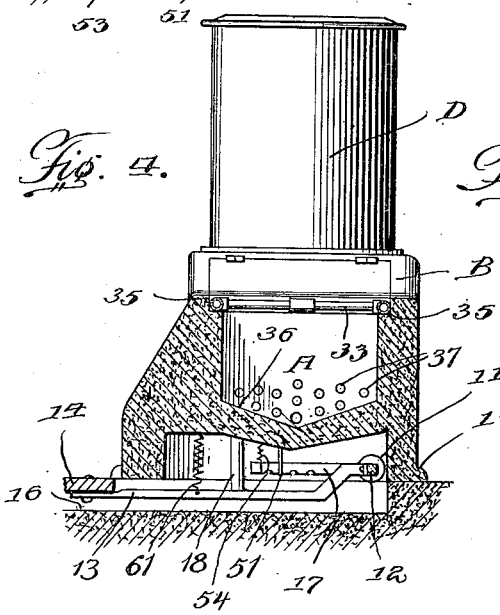

J. A. MAYNARD.
WATERING TROUGH.
APPLICATION FILED MAR. 14, 1914.

1,139,132.

Patented May 11, 1915.
3 SHEETS—SHEET 3.

Witnesses

Inventor
Joseph A. Maynard.
By Victor J. Evans.
Attorney

UNITED STATES PATENT OFFICE.

JOSEPH A. MAYNARD, OF RAVENA, NEW YORK, ASSIGNOR OF ONE-THIRD TO LOUIS PALTENGHI AND ONE-THIRD TO OSCAR BROOK, BOTH OF RAVENA, NEW YORK.

WATERING-TROUGH.

1,139,132.

Specification of Letters Patent. Patented May 11, 1915.

Application filed March 14, 1914. Serial No. 824,708.

*To all whom it may concern:*

Be it known that I, JOSEPH A. MAYNARD, a citizen of the United States, residing at Ravena, in the county of Albany and State of New York, have invented new and useful Improvements in Watering-Troughs, of which the following is a specification.

The invention relates to a watering apparatus, and more particularly to the class of animal watering troughs.

The primary object of the invention is the provision of a watering trough wherein the admission of water to and its discharge from the same is automatically controlled by the animal when stepping onto and off of a tread platform, so that the trough will be thoroughly sanitary, and each animal using the same will be supplied with fresh water without any possibility of waste thereof.

Another object of the invention is the provision of a trough wherein the same will be thoroughly flushed with water prior to an animal drinking fresh water let into the same, so that the walls of the trough will be thoroughly washed to avoid the possibility of the spreading of diseases from one animal to the other from using the trough for drinking purposes.

A further object of the invention is the provision of a watering trough of this character wherein the possibility of the freezing of the water is obviated, so that the trough can be used in cold weather as well as in warm weather, and the necessity of the filling of the same by hand or from a pump is obviated, and also the standing of water within the trough is avoided.

A still further object of the invention is the provision of a watering trough wherein the water supply and the dispensing of the same is controlled in a novel manner, and is automatically regulated to enable each animal to receive fresh water whenever it approaches the trough, and the supply of water to the trough is prevented from overflowing so that the waste of the supply is obviated.

A still further object of the invention is the provision of a watering trough of this character which is simple in construction, thoroughly reliable and efficient in its purpose, strong, durable, practical and serviceable in all of its functions, and inexpensive in manufacture.

With these and other objects in view, the invention consists in the construction, combination and arrangement of parts as will be hereinafter fully described, illustrated in the accompanying drawings, and pointed out in the claims hereunto appended.

Figure 2:
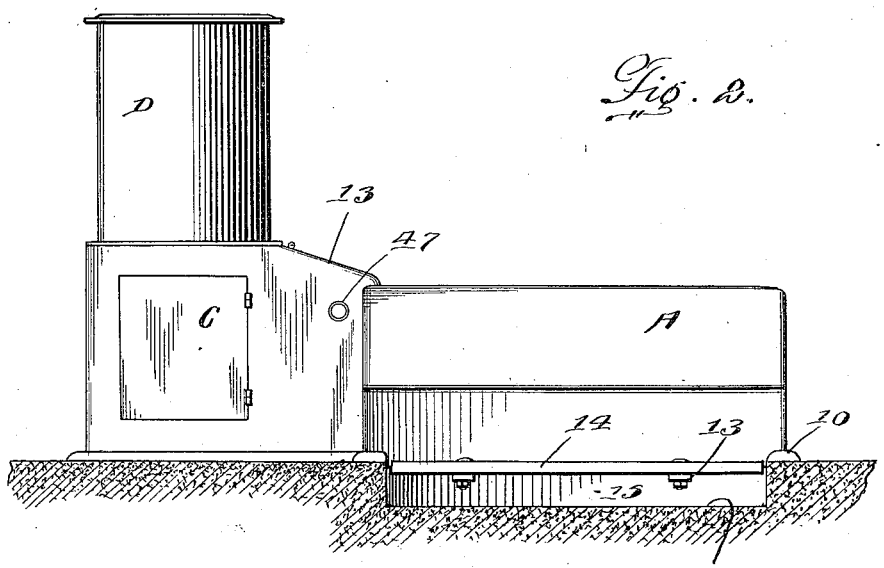
Figure 6:
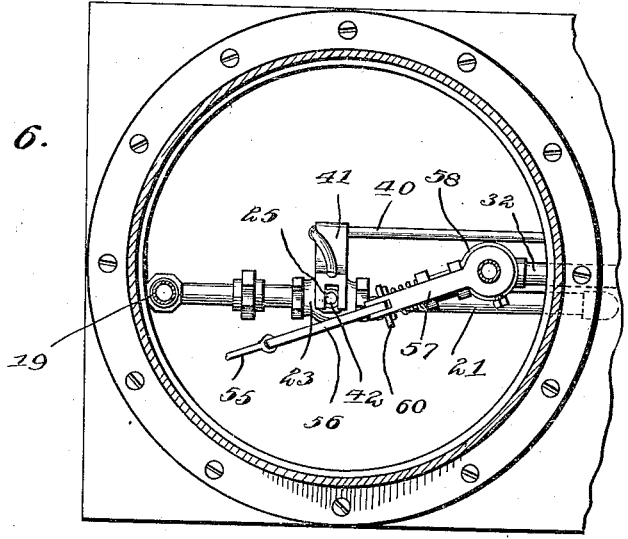
Figure 7:
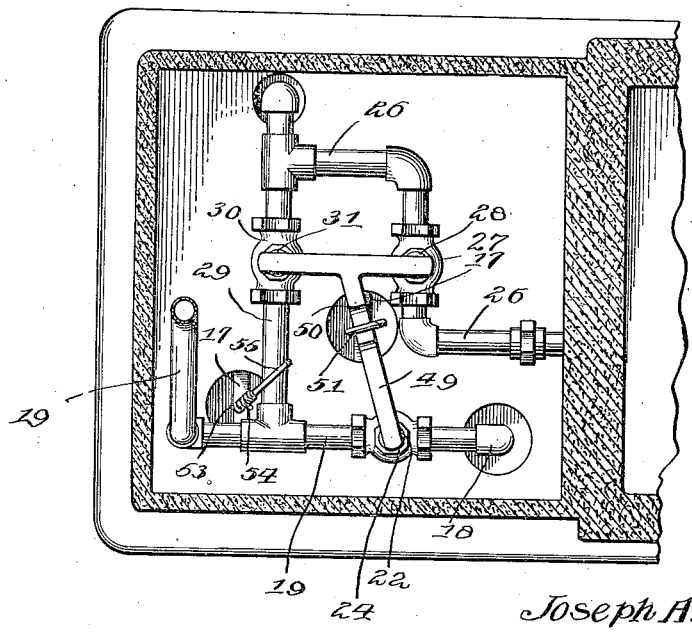

In the drawings:—Figure 1 is a top plan view of a watering trough constructed in accordance with the invention. Fig. 2 is a side elevation thereof. Fig. 3 is a vertical longitudinal sectional view through the trough. Fig. 4 is a sectional view on the line 4—4 of Fig. 1. Fig. 5 is a vertical transverse sectional view on the line 5—5 of Fig. 1. Fig. 6 is a sectional view on the line 6—6 of Fig. 3. Fig. 7 is a horizontal sectional view on the line 7—7 of Fig. 3.

Similar reference characters indicate corresponding parts throughout the several views in the drawings.

Referring to the drawings in detail, A designates generally the water trough, which is preferably made from cement, the edges of which are rounded so as to avoid sharp edges, which would result in injury to the animal when drinking from the trough, B a water reservoir, C a casing or housing, and D a flushing tank, the latter being removably supported upon the casing or housing C and is fastened thereto in any suitable manner, while the water reservoir is a part of the casing or housing and is joined with the water trough A at one end thereof. The water trough A and the casing or housing C joined thereto are supported upon a base or foundation frame 10 which has fixed to the inner faces of the opposite ends thereof bearings 11 in which is journaled a rocking shaft 12 having integral therewith or bolted or otherwise secured thereto spaced parallel supporting arms 13 which extend at right angles to the said shaft beyond one side of the water trough A, and has connected thereto a tread platform 14 which works within a well or space 15 formed by the frame 10, and is limited in its lowering movement by contacting with the bottom of the recess 16 formed in the foundation or ground, the platform 14 being bolted or otherwise secured to the arms 13 for the firm connection of the same.

Integral with or bolted or otherwise secured to the shaft 12 is a substantially U-shaped yoke forming spaced parallel arms 17 which project at right angles to the shaft beneath the bottom of the casing or housing C for a purpose presently described.

Leading through a suitable port or opening formed in the bottom of the housing or casing C is a water supply main 18 which has detachably coupled thereto a feed pipe 19, the same being extended upwardly into the flushing tank D, the pipe being preferably made in sections coupled together so that any one of the sections can be removed should the occasion require. Joining a pair of the sections of the pipe 19 is a T-union to which is connected a branch feed pipe 21, the same being extended into the reservoir B so that water may be delivered from the main into the water reservoir B and the flushing tank D, respectively. Arranged in one section of the pipe 19 and the branch pipe 21 are valve casings 22 and 23 respectively, the casing 22 being fitted with a spring controlled normally closed valve 24, while the valve casing 23 is fitted with a spring controlled normally open valve 25. These valves may be of any ordinary well-known construction.

Leading from the water reservoir B is a discharge pipe 26 which extends through the bottom of the casing or housing C and terminates at any suitable point for the discharge of water from the water trough A and reservoir B, the pipe 26 being fitted with a valve casing 27 in which is arranged a normally open spring-held valve 28, and tapped or united with the discharge pipe 26 and the pipe 19 at the delivery side of the valve 24 is a drain pipe 29 which is fitted with a valve casing 30 having arranged therein a spring-held normally open valve 31, so that when the water trough A and reservoir B are being drained the water which may stand in the vertical portion of the pipe 19 after the valve 24 has become closed will drain therefrom into the discharge pipe 26, thus obviating the possibility of the freezing of the water in the reservoir, trough or vertical portion of the pipe 19 when the trough is in use in cold weather.

Leading from the bottom of the flushing tank D through the water reservoir B is a flushing pipe 32, the same being united to a rectangular-shaped spraying frame 33 which is formed from piping having perforations 34, the frame 33 being seated within a groove 35 formed in the inner side of the mouth edge of the water trough A so that the water discharged from the frame 33 will flow down the inner faces of the walls of the water trough A for cleaning the same, the bottom 36 of the trough A being inclined toward the water reservoir B, and is of substantially hopper shape so that the contents of the trough will flow in the direction of the water reservoir B, the wall between the trough A and reservoir B being formed with a plurality of perforations 37 so that communication will be had between the trough and reservoir for the admission of water from the reservoir to the said trough or the discharge of water from the trough to the reservoir, the valve 31 being opened for the flushing of the trough in a manner presently described.

Fixed in the water reservoir B is a hanger 38 formed with a bearing 39 in which is journaled a rocking crank shaft 40 which extends into the casing or housing C and the reservoir B, the end of the shaft 40 extended into the casing or housing being fitted with an arm 41 which is connected with the stem 42 of the valve 25, while the opposite end of the shaft 40 is pivotally connected with a link 43, the same being pivotally connected to one arm of a bell crank lever 44 which is supported upon a pivot 45 mounted in one wall of the reservoir B, while the other arm of the lever 44 carries a ball float 46 which is adapted to rise with the water level so that the quantity of water admitted to the water reservoir B can be controlled, as the float 46 will cause the automatic closing of the valve 25, thereby shutting off the flow of water through the branch pipe 21 into the reservoir B when a predetermined water level has been reached therein. Leading through one wall of the water reservoir B at the desired elevation above the bottom thereof is a drain pipe 47 which prevents the possibility of an overflow in the water reservoir B, as will be clearly apparent.

Supported upon the stems 48 of the respective valves 24, 28 and 31 is a substantially T-shaped bridge piece 49 which is formed near the head thereof with notches 50, in either of which is adapted to be engaged one hook end of a link member 51, the opposite hook end of which is adapted to be engaged with any one of a series of notches 52 formed in one of the arms 17 on the shaft 12, while connected with the other arm 17 is the hook end 53 of a coiled retractile spring 54, the same being also connected to a pull rod 55 which is connected with one arm of a bell crank lever 56 pivotally supported in a bracket 57 secured to the flushing pipe 32, which is fitted with a valve casing 58 having arranged therein a spring-held normally open valve 59, the stem 60 of which is in contacting relation with the other arm of the bell crank lever 56 so that on movement of the said lever in one direction the valve 59 will be forced open, thus permitting the water within the flushing tank D to flow into the spraying frame for the flushing of the water trough A, thereby rendering it clean and thoroughly sanitary.

Connected to the arms 13 supporting the platform 14 are coiled retractile springs 61, the same being also connected to one side wall of the watering trough A, and these springs serve to normally hold the platform 14 elevated so that when an animal steps thereon it will become lowered for the rocking of the shaft 12, which automatically controls the valves hereinbefore mentioned for the supplying of water to the trough A for drinking purposes, and when the animal steps from the platform the water remaining within the trough A will be automatically discharged therefrom, and simultaneously therewith the flushing tank D will be in communication with the trough through the spraying frame 33 so that water discharged therefrom will cleanse the walls and bottom of the trough and at the same time the supply of water will be cut off from the reservoir.

In giving a further explanation of the mode of operation of the water trough it will be assumed that no water has been let into the trough A and the flushing tank D. Now, when an animal approaches the trough A and steps upon the platform 14 it is caused to tilt or become lowered, which rocks the shaft 12, and by movement of the arms 17 the bridge piece 49 is pulled upon, and likewise the chain 55 is pulled, so that the normally closed valve 24 is opened, and simultaneously therewith the normally open valves 31 and 59, respectively, are closed, while the valve 25 remains open, so that water from the main 18 will flow into the reservoir B and flushing tank D for the filling thereof. The water admitted to the reservoir B freely flows into the trough A for the filling of the same, so that the animal standing upon the platform 14 can drink the water within the trough, and thereafter when such animal steps from the platform 14 it rises to normal position under the action of the springs 61, causing the shaft 12 to rotate or rock in the reverse direction, and thus the valve 24 will instantly close and the valves 28, 31 and 59 will automatically open so that the water in the trough A will discharge through the discharge pipe 26, and the water within the tank D will be admitted to the spraying frame 33 which discharges the water onto the inner faces of the walls of the water trough A for cleaning the same to render it thoroughly sanitary and remove any germs therefrom so that diseases will not be spread among the animals using the trough, and each animal will be supplied with fresh water when drinking from the said trough. It is of course understood that when fresh water is let into the water reservoir B and it reaches a predetermined level, the supply thereto is automatically shut off under the operation of the float, as hereinbefore set forth.

From the foregoing it is thought that the construction and manner of operation of the device will be clearly understood, and therefore a more extended explanation has been omitted.

What is claimed is:

1. A watering apparatus comprising a trough, a water reservoir in communication therewith, a flushing tank having a spraying device in the trough, a main for supplying water to the tank and reservoir, and means operated by an animal for opening the main to the tank and reservoir and shutting off the spraying device.

2. A watering apparatus comprising a trough, a water reservoir in communication therewith, a flushing tank having a spraying device in the trough, a main for supplying water to the tank and reservoir, means operated by an animal for opening the main to the tank and reservoir and shutting off the spraying device, means for shutting off the supply of water from the main to the reservoir on its reaching a predetermined level in the latter, and means for bringing the first-named means to normal position when released by the animal.

3. A watering apparatus comprising a trough, a water reservoir in communication therewith, a flushing tank having a spraying device in the trough, a main for supplying water to the tank and reservoir, means operated by an animal for opening the main to the tank and reservoir and shutting off the spraying device, means for shutting off the supply of water from the main to the reservoir on its reaching a predetermined level in the latter, means for bringing the first-named means to normal position when released by the animal, and means automatically closing the main on the release of the first-named means.

4. A watering apparatus comprising a trough, a water reservoir in communication therewith, a flushing tank having a spraying device in the trough, a main for supplying water to the tank and reservoir, means operated by an animal for opening the main to the tank and reservoir, and shutting off the spraying device, means for shutting off the supply of water from the main to the reservoir on its reaching a predetermined level in the latter, means for bringing the first-named means to normal position when released by the animal, means automatically closing the main on the release of the first-named means, means operative on the release of the first-named means to discharge the water from the trough and reservoir, and means operative on the release of the said first-named means for opening the spraying device.

5. A watering apparatus comprising a trough, a water reservoir in communication therewith, a flushing tank having a spraying device in the trough, a main for supplying water to the tank and reservoir, means operated by an animal for opening the main to the tank and reservoir and shutting off the spraying device, means for shutting off the supply of water from the main to the reservoir on its reaching a predetermined level in the latter, means for bringing the first-named means to normal position when released by the animal, means automatically closing the main on the release of the first-named means, means operative on the release of the first-named means to discharge the water from the trough and reservoir, means operative on the release of the said first-named means for opening the spraying device, means for preventing overflow in the reservoir, and means for draining the supply means to the tank on the closing of the main.

In testimony whereof I affix my signature in presence of two witnesses.

JOSEPH A. MAYNARD.

Witnesses:
E. EDMONSTON, Jr.,
F. C. PARKER.

Copies of this patent may be obtained for five cents each, by addressing the "Commissioner of Patents, Washington, D. C."